Dec. 2, 1958 C. F. CARLZEN ET AL 2,863,131

TUBE SOCKET

Filed Jan. 3, 1955 2 Sheets-Sheet 1

INVENTORS
CARL F. CARLZEN,
WILLIAM L. LEHNER
BY & HOWARD A. WAGNER

Mason, Kolehmainen, Rathburn & Wyss
ATTORNEYS

TUBE SOCKET

Filed Jan. 3, 1955 2 Sheets-Sheet 2

INVENTORS
CARL F. CARLZEN,
WILLIAM L. LEHNER,
BY & HOWARD A. WAGNER
Mason, Kolehmainen, Rathburn & Wyss
ATTORNEYS United States Patent Office 2,863,131

Patented Dec. 2, 1958

2,863,131

TUBE SOCKET

Carl F. Carlzen, Buffalo, and William L. Lehner, Snyder, N. Y., and Howard A. Wagner, North Warren, Pa., assignors to Sylvania Electric Products, Inc., a corporation of Massachusetts Application January 3, 1955, Serial No. 479,518

8 Claims. (Cl. 339—193)

The present invention in general relates to tube sockets and in particular to tube sockets for use in conjunction with printed circuits and has for a principle object the provision of a new and improved tube socket enabling greater ease in the fabrication of printed circuits than has heretofore been known in the prior art.

Printed circuits as presently known include a chassis constructed of self-supporting sheet of insulating material on the surface of which is printed or deposited a plurality of passive circuit elements and interconnecting conductors. It is frequently desirable to interconnect into such circuits certain circuit components, such, for example, as vacuum tubes or transistors, which may not be readily deposited or printed on the chassis. In consequence thereof it has been found expedient to solder or braze tube sockets to the printed circuits and to insert vacuum tubes into these sockets.

In many instances it is necessary to interconnect the individual terminals of a particular tube socket to provide the desired vacuum tube circuit connections and it would be desirable to employ the space beneath the tube socket and the space between tube socket terminals for these connections so that cross over connections between terminals and shorter conductor paths may be employed. However, the contact pins of miniature type tubes, which are usually employed with printed circuits, are spaced relatively close together and on a relatively small diameter circle so that with conventional tube sockets such circuit connections cannot be made. In certain circuit applications it is also necessary to provide tube shields which must be grounded to prevent circuit interaction. However, most, if not all of the prior art arrangements have required a special tube socket arrangement for grounding the tube shield so that two types of socket assemblies must be stocked.

In certain prior art arrangements the tube socket terminals are connected to the printed circuit chassis board by soldering so that the terminals are rigidly secured in place. In such arrangements, when a tube is inserted into the socket the rigidly mounted tube socket terminals exert pressure on the pins of the tube with the result that the glass-to-metal seal of the tube pins is weakened and gas leaks may develop with consequent reduction in the life of the tube. In addition, the flux used in soldering may, in some instances, flow up onto the top surface of the printed circuit chassis board and collect between the tube socket terminals. The soldering flux has a lower insulation resistance than the chassis board and is hygroscopic so that moisture tends to be retained in these flux pockets with the result that the resistance between tube socket terminals is considerably reduced.

Since printed circuits are especially compatible with quantity production techniques and automatic assembly operations it would be desirable to provide a tube socket which can be mounted on the printed circuit chassis board and electrically connected thereto by means of automatic assembly apparatus. However, in prior art arrangements automatic assembly is not practical since no provision is made for nesting or stacking the tube sockets for automatic feed while orienting the tube sockets with respect to the printed circuit chassis board so that the tube sockets can be inserted into the board with the correct orientation with respect to the electrical circuit printed thereon.

It is, therefore, another object of the present invention to provide a new and improved tube socket for use with printed circuits wherein one or more of the above mentioned disadvantages and limitations of the prior art arrangements is eliminated.

It is a further object of the present invention to provide a new and improved tube socket for printed circuits wherein the space between tube socket terminals and beneath the tube socket may be utilized for circuit wiring to provide shorter conductor paths and a more compact circuit arrangement.

It is a still further object of the present invention to provide a new and improved tube socket for printed circuits wherein facilities for grounding the tube shield may be installed at the time the socket is assembled on the printed circuit chassis board so that one standard socket may be stocked for both shielded and unshielded tube applications.

It is another object of the present invention to provide a new and improved tube socket for printed circuits wherein a flexible coupling element is provided between the tube pin receptacles and the solder lug portions thereof so that the tube pins are held without strain and metal-to-glass seal leaks are minimized.

It is a further object of the present invention to provide a new and improved tube socket for printed circuits wherein the tube socket terminals are supported above the surface of the printed circuit board so that the resistance between tube socket terminals after soldering to the board is relatively high.

It is still another object of the present invention to provide a new and improved tube socket for printed circuits which is particularly adapted for use with automatic assembly apparatus in the automatic fabrication of printed circuit arrangements.

It is a still further object of the present invention to provide a new and improved tube socket for printed circuits wherein a center shielding sleeve is employed to isolate individual circuits connected to the tube socket terminals while permitting the sockets to be stacked one upon another for automatic feeding and assembly.

It is still another object of the present invention to provide a new and improved tube socket for printed circuits which may be correctly oriented with respect to the printed circuit board for assembly thereon by automatic means.

Briefly, in accordance with one aspect of the invention, there is provided a tube socket having a body of insulating material which is adapted to be positioned on the upper surface of a printed circuit board. The tube socket terminals comprise unitary tube pin receptacles and solder lugs which are loosely mounted in the tube socket body with the tips of the solder lug portions extending through corresponding slots in the printed circuit board. If desired, the tube socket may be held in place on the printed circuit board prior to the soldering operation by means of a center shielding sleeve which may extend through a relatively small central opening in the printed circuit board and may be snapped in place by means of detents on the protruding portion of the sleeve or other suitable means so that the board may be handled prior to the soldering operation. The extending portion of each solder lug has a reverse bend therein to space the tips of the solder lugs which extend through the board relatively far apart so that cross connections may be made in the space beneath the tube socket and printed circuit wiring run in between and insulated from the solder lug tips to permit shorter conductor paths. The reverse bend in the extending portion of each solder lug also provides a floating or strain relief connection between the solder tip portion which is secured to the board and the tube pin receptacle so that no strain is placed on the pins of a tube which is mounted in the socket and gas leaks due to injury of the glass-to-metal seal around the tube pins are minimized. The extending portions of the solder lugs are spaced above the upper surface of the printed circuit board by means of bosses provided on the bottom of the tube socket body so that the resistance between tube socket terminals remains relatively high even though soldering flux may flow over the upper surface of the board during the soldering operation. The solder lug portions and center shielding sleeve are so shaped that the sockets may be stacked one upon another and the tube socket body is provided with a vertically extending indexing channel in the periphery thereof so that the sockets may be automatically fed to the printed circuit boards in the correct orienttaion for assembly thereon. After the tube socket is mounted on the board, the indexing channel is adapted to receive a tube shield ground strap having a solder lug portion which extends through a slot in the board in a manner similar to the terminal solder lugs and has a spring finger portion extending above the tube socket on the top of the board which is adapted to engage and restrain a metal tube shield when the shield is placed over a tube mounted in the socket, the solder lug portion of the ground strap being soldered to the desired ground point on the printed circuit during the subsequent soldering operation so that the tube shield is electrically grounded and shields the tube therewithin.

The invention, both as to its organization and method of operation, together with further objects and advantages thereof, will best be understood by reference to the following specification taken in connection with the accompanying drawings, in which.

Figure 1:
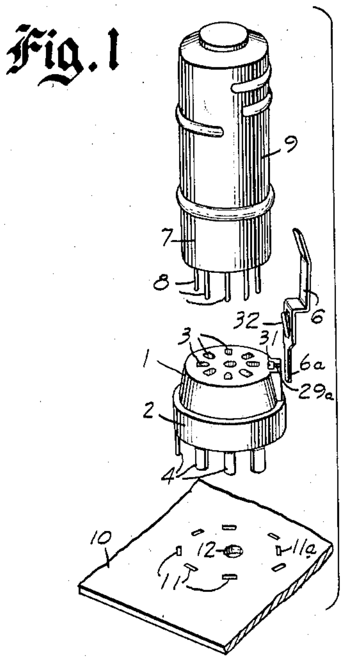
Fig. 1 is an isometric view of a tube socket embodying the features of the present invention and illustrating the manner in which the tube socket is mounted on a printed circuit board.
Figures 2, 3, 4:
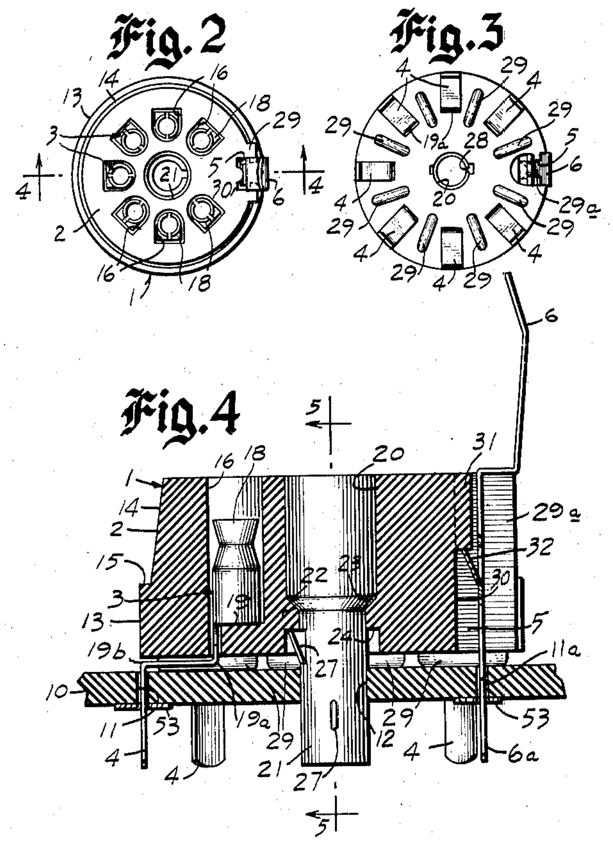
Fig. 2 is a top plan view of the tube socket of Fig. 1.
Fig. 3 is a bottom plan view of the socket of Fig. 2.
Fig. 4 is a sectional elevation taken along the line 4—4 of Fig. 2 and showing the tube socket mounted on a printed circuit board.
Figures 5, 7:
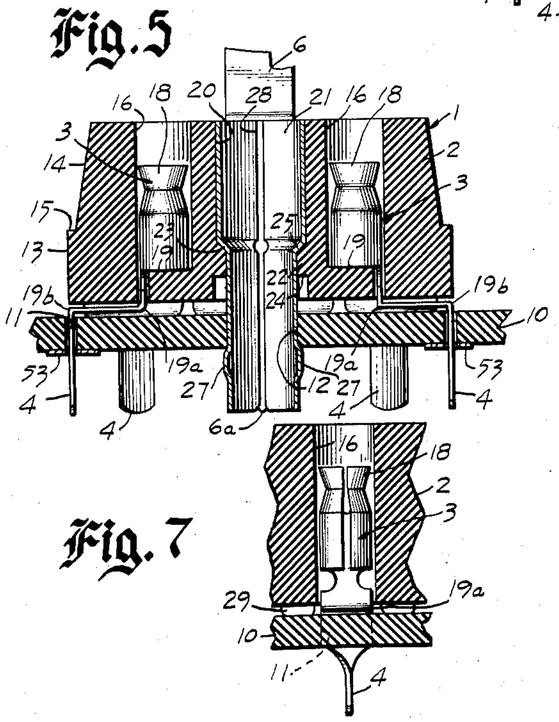
Fig. 5 is a sectional elevation taken along the line 5—5 of Fig. 4.
Fig. 7 is a fragmentary sectional view of another embodiment of the invention wherein a different arrangement for securing the tube socket to the chassis is employed.

Referring to the drawings and more particularly to Figs. 1 to 5, inclusive, thereof, there is shown a tube socket 1 comprising a body or housing 2 constructed of a suitable insulating material such as general purpose or low-loss phenolic, or the like. The tube socket terminals comprise a plurality of tube pin receptacles 3 which are positioned within recesses in the housing 2 in positions corresponding to the locations of the pins of the tube with which the socket is to be used and a plurality of solder lug portions 4 which are formed integrally with the receptacles 3 and extend from the bottom of the housing 2. An indexing channel 5, to be more fully described hereinafter, extends along one side of the housing 2 from the top to the bottom thereof and a tube shield grounding strap 6 may be inserted into the channel 5 after the tube socket 1 has been mounted on the top of a printed circuit board 10 which is formed of a suitable insulating material, the printed circuit conductors being formed in any desired manner on the bottom side of the board 10. A conventional vacuum tube 7, having a plurality of terminal pins 8 corresponding to the receptacle 3, may be inserted into the tube socket 1 and a cylindrical metal tube shield 9 slipped down over the tube 7, the ground strap 6 being provided with a spring finger portion which extends above the tube socket 1 and contacts the wall of the shield 9. The ground strap 6 is provided with a solder lug portion 6a which extends below the bottom of the housing 2. The printed circuit board 10 is provided with a plurality of slots 11 arranged to accommodate the solder lugs 4. A slot 11a is also arranged for insertion therein of the solder lug portion 6a of the ground strap 6. The portions of the lugs 4 and of the strap 6 which protrude from the bottom of the housing 2 are sufficiently long to stand through the board 10 when the base of the socket proper is pressed against it. The housing 2 is provided with a cylindrical base portion 13, a frustro-conical upper portion 14 and an intermediate annular shoulder 15. A plurality of recesses 16 in the housing 2 are adapted to receive the receptacles 3 each of which includes a spring biased gripping section 18 and the solder lug portion 4. The gripping sections 18 of the receptacles are substantially cylindrical and the lugs 4 are strip-like. To retain the receptacles 3 within the housing 2 a shoulder 19 is provided at the bottom end of each of the apertures 16 to prevent removal of the receptacles through the bottom of the housing. The lugs 4 are each provided with a sharp bend 19a (Fig. 4) radially outwardly at the point at which they extend from the housing 2 for the purpose of preventing removal of the receptacle through the top of the housing and so that the tips of the lugs 4 which extend through the board 10 are spaced relatively far apart and along a circle of considerably larger diameter than that of the tube pins 8 of the conventional miniature type tube 7. With this arrangement cross connections between individual lugs may be made on the printed circuit side of the board 10 as will be described in more detail hereinafter in connection with Fig. 12 of the drawings.

In order to permit stacking of the tube sockets 1 for purposes of automatic feeding and assembly, the lugs 4 are further provided with a reverse bend 19b (Fig. 4) at a point substantially adjacent the periphery of the base of the housing 2. The shoulder 15 has a width exceeding the thickness of the lugs 4, and the conical section 14 of the housing 2 exceeds in length the length of the downwardly extending portions of the lugs 4 so that the sockets 4 may conveniently be stacked one on another even though the lugs 4 do not extend radially from the housing. The above described double bend, which results in the end portions of the lugs being L-shaped, also provides a floating or strain relief coupling between the tips of the lugs 4 and the gripping sections 18 of the receptacles. Accordingly, even though the tips of the lugs 4 are rigidly connected to the board 10 after soldering, the receptacles 3 are free to move about within the recesses 16 and can accommodate slight variations in the positions of the tube pins without exerting a strain on the glass-to-metal seal of the tube pins so that gas leaks through these seals are minimized. In addition, this double bend construction prevents a direct pull on the solder joint at the tip of the solder lug when a tube is removed from the tube socket. In order to insure the above described floating connection and to provide an air space between the bottom of the housing 2 and the top of the board 10, a plurality of radially extending bosses 29, each having a height substantially greater than the thickness of the lugs 4, are provided on the bottom of the housing 2 between each solder lug. With this construction the housing 2 rests on the bosses 29 and the double bend portions of the lugs 4 may shift to adjust to different tube pin positions. The bosses 29 serve to increase the leakage path between the lugs 4 and also position the lugs above the surface of the board 10 so that soldering flux, which may be forced up through the slots 11 during the soldering operation, does not interconnect adjacent lugs. This soldering flux is of lower insulation resistance than the board and is hygroscopic so that moisture may be retained therein and the resistance between lugs substantially reduced if they are embedded in a mass of the flux.

In order to isolate the circuits connected to the individual tube socket terminals, the housing 2 is further provided with a central aperture 20 in which is located a center shielding sleeve 21 the bottom portion of which extends through the opening 12 in the board 10 and may be grounded to provide a shield between the lugs 4 and receptacles 3. The aperture 20 is provided with an inwardly extending annular flange 22 having a tapered upper surface 23 and a lower surface 24. The sleeve 21 is provided with a shoulder 25 having a tapered surface which mates with the surface 23 of the flange 22. Therefore, when the center shield 21 is inserted within the aperture 20 it is supported within the housing 2 by the opposing shoulders 23 and 25. The center shield 21 is also provided with an outwardly spring biased tab which abuts against the surface 24 of the flange 22 when the shield 21 is inserted into the housing 2 and the shoulders 23 and 25 moved into engagement. Consequently, as the shield 21 is inserted within the aperture 20 from the top of the socket, the tab 26 rides over the shoulder 25 and snaps under the surface 24 when the shield 21 is fully inserted. The shield 21 is conveniently formed from sheet metal and the outer diameter of the downwardly extending portion thereof is made smaller than the inner diameter of the upper end so that the lower end of one shield fits within the upper end of the next succeeding shield when the sockets are stacked one upon another.

Figure 6:
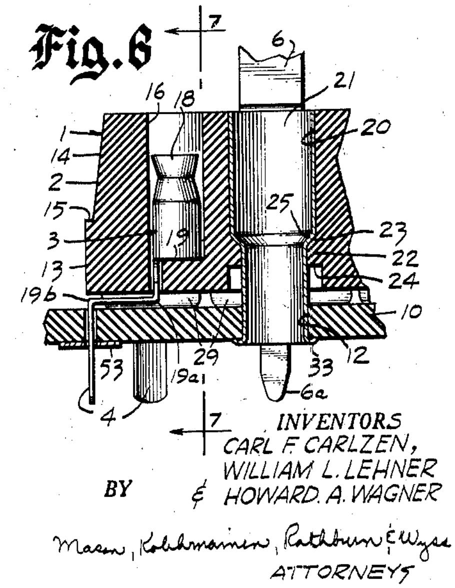
Fig. 6 is a fragmentary sectional elevation of an alternative embodiment of the invention wherein the tube socket is secured to the printed circuit board in a somewhat different manner.
Figure 8:
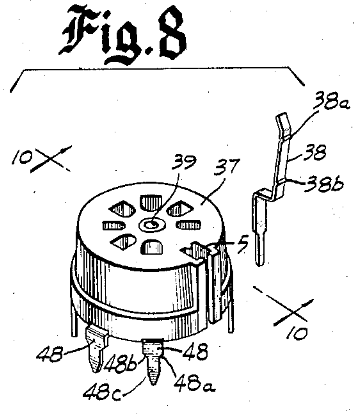
Fig. 8 is a perspective view of a further alternative embodiment of the invention.

In order to hold the tube socket 1 on the board 10 prior to the soldering operation, a pair of bulges 27 are provided in the protruding portion of the center shield 21 and may be conveniently formed by dimpling of the sheet metal prior to the forming of the shield. The upper ends of the bulges 27 are positioned at a distance from the bottom of the housing 2 substantially equal to the sum of the thicknesses of the bosses 29 and the board 10 and the shield 21 is longitudinally split throughout the entire length thereof at 28 such that the diameter thereof may be reduced in response to inwardly and oppositely directed forces. Therefore, as the shield 21 is inserted within the aperture 12 the wedging action of the curved upper ends of the bulges 27 compresses the shield a sufficient amount to permit the passage of these bulges through the aperture 12. When the shield has been inserted a sufficient amount that the bulges 27 clear the bottom of the board 10, the spring action of the sheet metal causes expansion of the shield. Thereafter the coaction of the bulges 27 and the bottom of the board 10, secures the socket to the board. Since this securing of the socket to the chassis board by the shield 21 is only a temporary expedient to be relied upon only until the lugs 4 have been soldered to the printed circuit, the snap action provided by the bulges 29 is generally sufficient. However, if desired, the construction shown in Fig. 6 may be employed wherein the center shield 21 is formed over at 33 after insertion through the board 10 so as to rivet the tube socket to the board. In the alternative, the center shield 21 may be eliminated in situations where circuit isolation is not important and the arrangement shown in Fig. 7 employed wherein two diametrically opposed solder lugs are twisted through an angle of about ninety degrees after insertion through the slots 11 so as to secure the tube socket 1 to the board 10 prior to soldering.

It will be noted that the indexing channel 5 can be employed as an orientation means for automatic hopper feeding of the tube sockets to the printed circuit boards and before insertion of the tube shield ground strap 6 therein. This arrangement is also compatible with the requirement that the sockets be stacked for automatic feeding since the sockets do not readily fit one within another when the ground straps 6 are in place. Furthermore, tube shields are not required for many circuits so that the provision of a separate tube shield ground strap which can be inserted after the socket is assembled on the board and can be soldered at the same time as the tube socket solder lugs is particularly desirable. The channel 5, which is generally T-shaped, has a base leg **29*a* extending radially to the edge of the housing 2 and a cross leg 30. A shoulder 31 extends across a portion of the leg 30 and for ease of manufacture the portion of the housing 2 adjacent the open side of the slot 5 is not tapered. Thus, the leg 29*a* of the slot 5 provides a convenient channel for indexing the sockets in a hopper for automatic assembly operations. For example, a tubular guide member may be provided with an inwardly extending rail on which the indexing channels 5 of the sockets ride. The guide member is so located and the rail so aligned with respect to the printed circuit boards that the solder lugs of the socket are properly oriented with their respective slots in the chassis. The ground strap 6 which is inserted within the cross leg 30 of the channel 5 is constructed of spring metal and is provided at the upper end with a reverse bend and an intermediate angularly extending tongue 32 for coaction with the shoulder 31 to secure the strap 6 within the housing 2 after it is inserted within the channel 5**.

In Figs. 8 to 11, inclusive, there is shown an alternative embodiment of the invention wherein a socket housing 37, which is generally similar to the housing 2 in Fig. 1, is provided with a tube shield ground strap support and indexing channel 5 for the reception of a tube shield ground strap 38. The strap 38 has the same general configuration as the strap 6 but is additionally provided with a pair of spaced cross ridges **38*a* and 38*b*** to provide greater rigidity for the upper spring finger portion thereof.

Figures 9, 11:
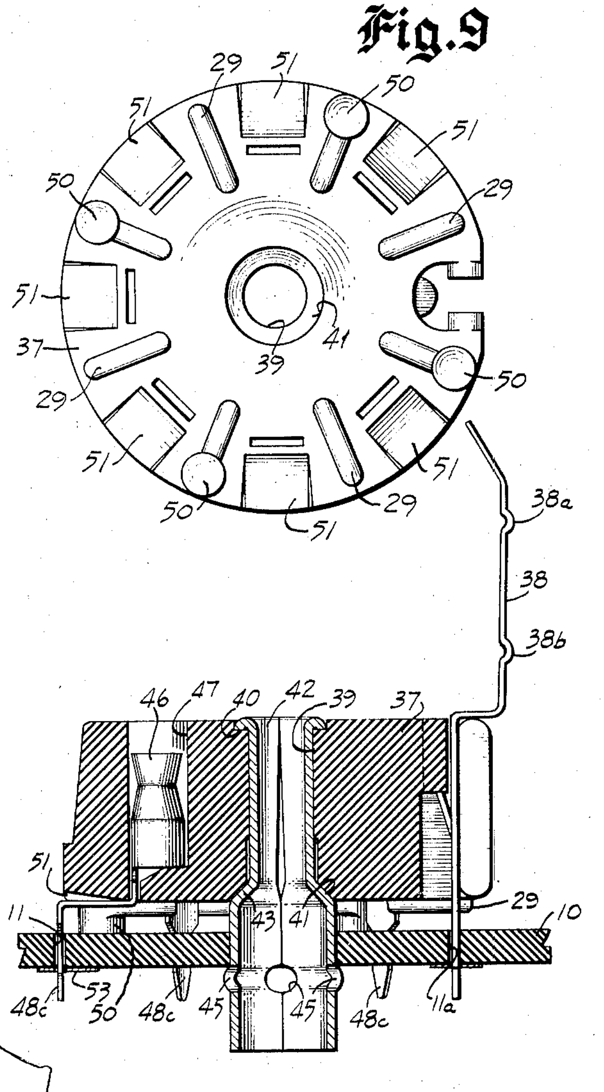
Fig. 9 is a bottom plan view of the socket of Fig. 8 prior to the assembly therein of the tube pin receptacles.
Fig. 11 is a sectional side elevational view taken through the center line of the tube socket of Fig. 8 and showing the socket assembled on a printed circuit board.
Figure 10:
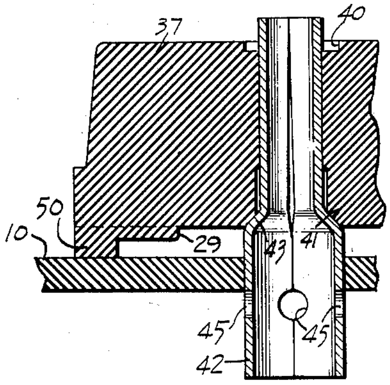
Fig. 10 is a fragmentary sectional view taken along lines 10—10 of Fig. 8 and showing the socket positioned on a printed circuit board before being secured thereto.

A central aperture 39 having countersunk rabbets 40 and 41 respectively at the top and bottom of the housing 37 is adapted to receive a center shield 42 having an annular shoulder 43 intermediate the ends thereof. The shoulder 43 is adapted to mate with the rabbet 41 and to coact with the peened over top portion of the shield 42 to secure the same to the socket 37. The shield 42 is also provided with a plurality of apertures 45 which weaken the shield at the locations thereof such that a compressing force on the shield 42 after it has been inserted through the board 10 causes it to bulge out in the vicinity of the apertures 45 as shown in Fig. 11 so that the socket is secured to the printed circuit board. In this connection, it will be understood that the apertures 45 may be employed in a center shield of the type employed in the embodiment of Figs. 1 to 5, inclusive, and the shield crimped to secure the socket to the board instead of employing the snap-in bulges 27. If desired, the shield 42 may be assembled to the socket 37 at the same time the socket is secured to the printed circuit board. Thus, as shown in Fig. 10, the shield 42 is inserted up through the center aperture in the board 10 and into the socket 37 until the shoulder 43 rests on the shoulder 41. The top of the shield 42 may be peened over and the side walls adjacent the apertures 42 bulged outwardly by striking the bottom of the shield 42 while the top thereof is held against a suitable forming member.

The socket 37 is provided with a plurality of tube pin receptacles 46 having a diameter substantially less than that of the recesses 47 in which they are supported to permit freedom of movement thereof which reduces stress on the tube pins and the glass envelope in which they are moulded. As described heretofore, reduction of this stress by the hereinbefore described floating action together with the freedom of movement of the receptacles 46 in the socket housing 37, increases the life of the discharge tube used therewith by eliminating the greatest cause of vacuum leakage, namely, rupture of the seal between the tube pins and the tube envelope.

The solder lugs 48, which are integral with the receptacles 46 and are provided with a reverse bend in the outwardly extending portion thereof, are each provided with a pair of shoulders 48*a* and 48*b* terminating in a portion 48*c* of reduced width which extends through and beneath the board 10 when the socket 37 is assembled thereto. The shoulders 48*a* and 48*b* are tapered to facilitate insertion thereof into the sockets by automatic machinery, and abut against the top of the board 10 adjacent the ends of the slots 11 when the lugs 48 are inserted therein. Additional air space may thus be provided between the bottom of the socket 37 and the board 10 by properly selecting the position of the shoulders 48*a* and 48*b* along the lugs 48. The use of the narrowed down terminal lug 48 enables the use of smaller slots 11 in the chassis 10, thereby to provide a greater usable surface area for the circuit connections and a stronger circuit board. In those applications where a greater air space than is commensurate with supporting the socket 37 on the thin lugs 48 is desired, a plurality of sturdy cylindrical bosses 50 are provided at spaced locations on the bottom of the socket housing 37. Preferably, the ridges 29 are retained because they provide an increased leakage path between the solder lugs 48. In order to facilitate a bending of the lugs 48 so that the intermediate portion thereof lies flat against the bottom of the socket housing 37, a plurality of recesses 51 are provided in the housing 37 to permit overbending of the lugs during the bending operation.

Figure 12:
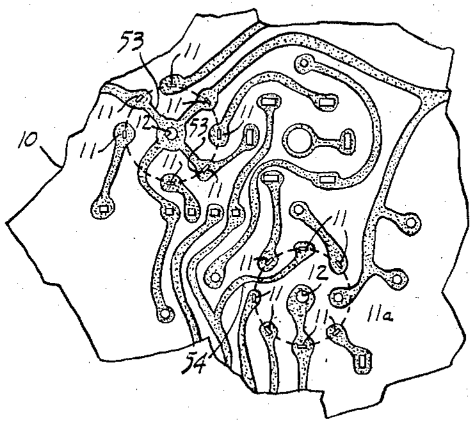
Fig. 12 is a fragmentary bottom plan view of a printed circuit board with which the tube socket of the present invention may be employed.

In Fig. 12 there is shown the bottom of a printed circuit chassis board 10 which may be used with the socket of the present invention. It will be noted from this figure that cross over connections can be made between lugs and conductors passed between adjacent lugs due to the fact that the tips of the solder lugs are spaced radially outwardly from the tube pins. Thus, the conductors 53, which may be printed or deposited on the board 10 in any suitable manner, may be provided in the space beneath one tube socket to connect the same to the center shield of the socket. Also, the conductor 54 can be led between two adjacent solder lugs so that shorter conductor paths can be employed and a more compact circuit arrangement laid out.

It will be noted that in all of the disclosed embodiments of the invention the tube socket may be used in conjunction with a prepunched printed circuit chassis board to enable dip soldering of the lugs 4 to the printed circuits without harm to the socket. When the socket is fastened to the chassis, only the tips of the lugs 4 extend therebeneath. The bottom of the chassis may then be soldered at the desired circuit connection points without burning the socket housing since the board 10 itself provides an efficient heat shield.

The term tube as used in this specification is intended to include any integral circuit element or elements which is provided with a number of external pins through which connection with other parts of an electric circuit is made. The term tube socket refers to a connector which is located intermediate these pins and the remainder of the electric circuit and which permits quick insertion and removal of tubes into and out of the overall circuit. For purposes of clarity, but not by way of limitation the invention has been particularly described in connection with a socket for use with an electron discharge device.

While particular embodiments of the present invention have been shown it will be understood that this invention should not be limited thereto since, of course, many modifications may be made. Therefore, by the appended claims we intend to cover all such changes and modifications as fall within the true spirit and scope of our invention.

What is claimed as new and is desired to be secured by Letters Patent of the United States is:

1. The combination of a substantially flat insulating board having a plurality of slots therein, a tube socket having a plurality of tube pin receptacles arranged therein, a plurality of unitary contacts supported within said receptacles and extending through said slots, said contacts having tapered shoulders on opposite sides of the extending portion thereof, said shoulders being adapted to be partially received in said slots and to engage the top of said board adjacent the ends of said slots to space said socket from said board and means for securing said socket to said board.

2. A tube socket comprising an insulating housing, said housing including a plurality of equi-angle segments, one of said segments being grooved along the outer periphery thereof, a tube shield ground strap disposed within said groove and a shoulder on a wall of said groove intermediate the ends thereof, said shoulder being adapted to engage said tube shield ground strap to fixedly position it within said groove, and tube pin receptacles located within others of said segments.

3. A tube socket comprising an insulating housing, a plurality of receptacles in said housing, a plurality of integral tube pin contacts and terminal members located within said receptacle with said terminal members extending from the bottom of said housing, the portions of said terminal members which protrude from said housing being substantially L-shaped, the portion of said L-shaped portion which is adjacent said contact being substantially parallel to the base of said housing and other leg of said L-shaped portion extending perpendicularly of the base of said housing near the periphery of said housing, the upper portion of said housing being conical, the length of said conical portion exceeding the length of the downwardly extending leg of said L-shaped portion so that when said sockets are stacked one upon the other the downwardly directed legs of one socket may surround the conical other portion of the next adjacent lower socket.

4. In a tube socket the combination of a support having a substantially frustro conical shaped upper portion, tube pin receptacles arranged within said support, contact means in said receptacles, and lugs connected to said contact means and extending without said housing, the extending portion of said lugs being L-shaped with the inner surface of the outer leg thereof being substantially perpendicular to the bottom of said support and disposed outwardly of the sides of the upper portion of said support.

5. A tube socket comprising a socket housing formed to provide a plurality of tube pin receptacle receiving recesses, a bottom surface and generally sloping sides terminating in a smaller top surface, a separate pin receptacle mounted in each of one or more of the housing recesses, said pin receptacles each having an integrally attached solder lug extending from the socket housing to provide a downward extending substantially vertical end portion terminating outside of the horizontal projection of the top surface and below the bottom surface of the socket housing.

6. A tube socket comprising a socket housing formed to provide a plurality of receptacle receiving recesses, an integrally formed base portion terminating in a bottom surface and a substantially frustro-conical upper portion terminating in a top surface and including an indexing channel of generally T-shaped cross section extending substantially vertically along the outer periphery of the base and upper portions of said housing, said indexing channel being adapted to receive a tube shield ground strap, a separate tube pin receiving receptacle for each of one or more receiving recess having a tube pin contact portion relatively loosely mounted internal the receiving recess with a lug portion extending from a slot in the base portion of said housing, said lug portion extending radially adjacent the bottom housing surface and downwardly to terminate external the horizontal projection of the top surface and beneath the bottom surface of the socket housing.

7. The combination of a insulating board having a plurality of slots in a substantially flat portion thereof, a tube socket housing having a bottom surface and generally sloping sides terminating in a top surface smaller than the bottom surface, an annular series of unitary contacts supported within said housing, each of said contacts being attached to a separate external downward extending solder lug terminating below the bottom surface of said socket housing and outside of the projection of the top surface of said socket housing in locations corresponding to the locations of said slots in said insulating board, said contacts extending through said slots, and means securing said socket to said board with the base of said socket spaced from said board.

8. A tube socket comprising a substantially cylindrical insulating housing having a tapered upper end portion terminating at the upper surface and a lower portion terminating at a bottom surface, a plurality of terminal lugs protruding from the bottom of said housing and extending substantially along said bottom to the periphery of said housing at which point said lugs are bent to terminate substantially beneath said housing external the horizontal projection of the top surface of said housing.

References Cited in the file of this patent

UNITED STATES PATENTS

| | | |
|---|---|---|
| 2,286,984 | Del Camp | June 16, 1942 |
| 2,444,048 | Keller | June 29, 1948 |
| 2,455,324 | Wagstaff | Nov. 30, 1948 |
| 2,519,121 | Del Camp | Aug. 15, 1950 |
| 2,529,502 | Kelly | Nov. 14, 1950 |
| 2,542,144 | Kearns | Feb. 20, 1951 |
| 2,571,845 | Del Camp | Oct. 16, 1951 |
| 2,595,188 | Del Camp | Apr. 29, 1952 |
| 2,613,244 | Del Camp | Oct. 7, 1952 |
| 2,623,086 | Sampson | Dec. 23, 1952 |
| 2,784,386 | MacFadden | Mar. 5, 1957 |

FOREIGN PATENTS

| | | |
|---|---|---|
| 711,016 | Great Britain | June 23, 1954 |

OTHER REFERENCES

Sylvania-Tele-Tech, June 1954, page 4.